(12) United States Patent
Allgaier et al.

(10) Patent No.: US 12,228,913 B2
(45) Date of Patent: Feb. 18, 2025

(54) METHOD AND DEVICE FOR ADJUSTING SIGNALLING OF A FIELD DEVICE

(71) Applicant: VEGA Grieshaber KG, Wolfach (DE)

(72) Inventors: Volker Allgaier, Haslach im Kinzigtal (DE); Florian Krämer, Mühlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 849 days.

(21) Appl. No.: 17/309,228

(22) PCT Filed: Nov. 8, 2019

(86) PCT No.: PCT/EP2019/080651
§ 371 (c)(1),
(2) Date: May 10, 2021

(87) PCT Pub. No.: WO2020/099258
PCT Pub. Date: May 22, 2020

(65) Prior Publication Data
US 2021/0389755 A1 Dec. 16, 2021

(30) Foreign Application Priority Data
Nov. 13, 2018 (DE) ..................... 10 2018 219 371.1

(51) Int. Cl.
*G05B 19/418* (2006.01)
*H04W 4/80* (2018.01)

(52) U.S. Cl.
CPC ..... *G05B 19/4183* (2013.01); *G05B 19/4185* (2013.01); *G05B 2219/25428* (2013.01); *G05B 2219/31467* (2013.01); *H04W 4/80* (2018.02)

(58) Field of Classification Search
CPC ............ G05B 19/4183; G05B 19/4185; G05B 2219/25428; G05B 2219/31467;
(Continued)

(56) References Cited

U.S. PATENT DOCUMENTS 8,285,038 B2   10/2012  Hunt
9,311,114 B2   4/2016   Ramchandran et al.
(Continued)

FOREIGN PATENT DOCUMENTS

CN   101099396 A   1/2008
CN   104714799 A   6/2015
(Continued)

OTHER PUBLICATIONS

International Preliminary Report on Patentability and Written Opinion of the International Searching Authority issued in International Application No. PCT/EP2019/080651, mailed Feb. 2, 2020, 9 pages.
(Continued)

*Primary Examiner* — Thomas C Lee
*Assistant Examiner* — Tyler Dean Hedrick
(74) *Attorney, Agent, or Firm* — Sterne, Kessler, Goldstein & Fox P.L.L.C.

(57) ABSTRACT

A method and a user device (10) for adapting a signaling of the field device (100) that can be displayed via a signal display (102) of a field device (100) are proposed. For this purpose, an user device (10) is used to define a color tone of at least one display element (104) of the signal display (102) of the field device (100), an attribute is assigned to the defined color tone of the at least one display element (104) of the signal display (102), wherein the attribute represents a meaning of the determined color tone for indicating a state of the field device (100), and a control signal is transmitted from the user device (10) to the field device (100), wherein the control signal contains information regarding the determined color tone and regarding the attribute associated with the determined color tone.

14 Claims, 2 Drawing Sheets

(58) Field of Classification Search
CPC ..... G05B 2219/31211; G05B 23/0272; H04W 4/80; H04Q 2213/13095; G01D 7/005; G01F 23/0007; G08C 17/00; G08C 19/00; G08C 17/02
See application file for complete search history.

(56) References Cited

U.S. PATENT DOCUMENTS

| | | | |
|---|---|---|---|
| 9,773,168 | B2 | 9/2017 | Chatow et al. |
| 10,378,747 | B1* | 8/2019 | Hanslip ............... H05B 45/20 |
| 10,692,421 | B2 | 6/2020 | Monse et al. |
| 10,725,443 | B2 | 7/2020 | Griech et al. |
| 11,860,019 | B2 | 1/2024 | Hengstler et al. |
| 2010/0164717 | A1 | 7/2010 | Hammer et al. |
| 2010/0238026 | A1* | 9/2010 | Batten ............. G08G 1/096783 340/540 |
| 2012/0045121 | A1* | 2/2012 | Youngman ......... G06Q 30/0643 382/162 |
| 2014/0334723 | A1 | 11/2014 | Chatow et al. |
| 2016/0343352 | A1 | 11/2016 | Ganguly |
| 2018/0181222 | A1 | 6/2018 | Ivanov |
| 2018/0364649 | A1* | 12/2018 | Kim ...................... G04G 9/00 |
| 2019/0053770 | A1* | 2/2019 | Liu ..................... A61B 5/369 |
| 2020/0149989 | A1 | 5/2020 | Jost et al. |
| 2021/0157167 | A1* | 5/2021 | Lim .......................... G02C 5/02 |
| 2022/0088469 | A1* | 3/2022 | Bovino ................... A63D 5/04 |

FOREIGN PATENT DOCUMENTS

| | | |
|---|---|---|
| CN | 106569678 A | 4/2017 |
| CN | 106891830 A | 6/2017 |
| CN | 106981277 A | 7/2017 |
| DE | 102004020393 A1 | 11/2005 |
| DE | 102006016381 A1 | 10/2007 |
| DE | 102007026244 A1 | 12/2008 |
| DE | 102014118394 A1 | 6/2016 |
| DE | 102016010800 A1 | 12/2016 |
| DE | 102018219370 B3 | 10/2019 |
| DE | 102021108255 B3 | 9/2022 |
| EP | 3 451 087 A1 | 3/2019 |
| WO | 2008148777 A1 | 12/2008 |

OTHER PUBLICATIONS

International Search Report directed to International Patent Application No. PCT/EP2019/080651, mailed Feb. 4, 2020; 5 pages.

* cited by examiner

METHOD AND DEVICE FOR ADJUSTING SIGNALLING OF A FIELD DEVICE

REFERENCE TO RELATED APPLICATIONS

The present application claims priority of German Patent Application No. 10 2018 219 371.1, filed Nov. 13, 2018, which is incorporated herein by reference in its entirety.

FIELD OF THE INVENTION

The invention relates generally to the field of process automation. In particular, the invention relates to a method for adapting a signaling of the field device displayable via a signal display of a field device by means of an user device, an user device for adapting a signaling displayable via a signal display of a field device, the use of such an user device, a program element, and a computer-readable medium comprising such a program element.

BACKGROUND OF THE INVENTION

Field devices are widely used in process automation to monitor and/or determine one or more process variables. For example, field devices can be used to determine a pressure of a medium, a level of a medium, a flow rate, a flow velocity, and/or other process variables.

Typically, field devices have a signal display, which can, for example, have one or more display elements, such as at least one light-emitting diode (LED), a colored light-emitting diode and/or a multicolor light-emitting diode. Here, the signal display generally serves to signal a state of the respective field device. Such a state may, for example, represent and/or indicate an operating mode of the field device, a status of the field device, an error or the occurrence of an error, a maintenance notice or the like. Different colors of the signal display and/or of the at least one display element of the signal display may have different meanings and/or indicate and/or represent different states of the field device. Different standards sometimes exist for the meaning of the different colors. However, manufacturers of the field devices may also define their own color combinations and/or meanings independently of the standards. Also, in part, when a field device is ordered by a customer, a specific color combination of the signal display, a specific color of the signal display and/or a specific color tone of the signal display for signaling as well as the associated meanings and/or display windows for the respective signaling can be specified.

SUMMARY OF THE INVENTION

Embodiments of the present invention may advantageously provide an improved method and a corresponding user device for adjusting, customizing and/or setting a signaling displayable via a signal display of a field device.

This is provided by the subject matter of the independent patent claims. Further embodiments of the invention are incorporated in the dependent claims and the following description.

The following description applies equally to the method, the user device and the use of the user device. In other words, features, elements and/or steps described below with reference to the method apply equally to the user device and the use of the user device, and vice versa.

One aspect relates to a method for adapting, customizing, modifying and/or adjusting a signaling, in particular a color signaling and/or colored signaling, of a field device that can be displayed and/or output via a signal display (also referred to as display or user interface) of the field device. The method comprises the following steps:

specifying, with a user device, a color tone (also referred to as color shade, color or hue) of at least one display element of the signal display;

associating and/or linking, with the user device, an attribute to the specified color tone of the at least one display element, the attribute representing and/or having a meaning of the specified color tone for indicating a state of the field device; and transmitting a control signal from the user device to the field device, the control signal containing information and/or data relating to the specified color tone and relating to the attribute associated with the specified color tone.

The method according to the invention advantageously enables a user of the field device to customize the signaling of the field device, which can be output via the signal display of the field device, individually, flexibly, quickly and in a simple manner via the user device. Also, the method according to the invention has the advantage that the field device does not have to be disassembled and/or reprogrammed in a time-consuming manner in order to adapt the signaling. In this way, an operator of the field device can design the signaling himself, for example, if the default setting, which was set at the factory, does not or no longer meets the requirements or standards.

The field device may be any field device for determining any process variable and/or measurand. For example, the field device can be a level meter for detecting a level of a medium, such as in a container, a pressure meter for detecting a pressure of a medium and/or e.g. a superimposed gas phase, a flow meter for detecting a flow of the medium, a flow velocity meter for detecting a flow velocity of the medium, a temperature meter and/or any other field device.

The user device can basically be any terminal device that can establish a communication link with the field device, for example. The user device and the field device can be independent and/or separate devices. For example, the user device may be a portable and/or mobile user device. Alternatively or additionally, the user device may be a tablet PC, a smartphone, a laptop, a device type manager (also referred to as a DTM), a PC, and/or a computer. For example, a DTM may be installed on a PC, laptop and/or computer as operating software, such as similar to a driver for the field device. In particular, the user device may be configured for wireless communication with the field device. Alternatively or additionally, however, the user device can also be configured for wired communication with the field device, for example via a bus connection.

The signal display may have at least one display element that may display one or more color tones and/or colors. For example, the signal display may have a light-emitting diode (LED), a colored light-emitting diode, a multicolor light-emitting diode, and/or any other display element, such as a display and/or a display window. In particular, the signal display may have multiple display elements. For example, the signal display may have multiple light emitting diodes. The color tone of several or all display elements of the signal display may be adjusted according to the method according to the invention, in particular individually and/or independently for each display element.

Generally, signaling of the field device in the context of the present disclosure may denote an output of an optical signal via the signaling device of the field device. Such output and/or signaling may serve to indicate a state of the field device. For example, in the context of the present disclosure, a state of the field device may be a status of the field device, such as "connected", "active", "not connected", "inactive", or the like. Also, the state of the field device may be an error, the occurrence of an error, a warning indication, and/or a maintenance indication. Also, the state output via the signal indicator may be related to the process variable and/or measurand sensed by the field device. For example, the reaching of a limit level of a medium can be indicated via the signal display. The state of the field device indicated via the signal display and/or the color tone of the at least one display element of the signal display can thus indicate the occurrence and/or occurrence of a condition associated with the state.

If the signal display has only one display element, the signaling can take place via the color and/or the color tone of the display element. If, on the other hand, the signal display has a plurality of display elements, for example a plurality of LEDs, signaling can also be performed via one or more color tones of one or more display elements of the signal display. In other words, signaling may be performed via a color tone of one display element of the signal display or via a combination of multiple color tones of multiple display elements of the signal display. In the latter case, the color tones of different display elements may be identical or different from each other.

The attribute can be used to associate the color tone of the signal display with a meaning of the color tone, so that a user can read and/or determine the state of the field device based on the color tone of one or more display elements of the signal display. The attribute may therefore represent, describe, and/or have the particular state of the field device. Alternatively or additionally, the attribute may define the state of the field device and/or a condition for the occurrence of the state. Analogous to the states of the field device explained above, the attribute may therefore describe a state of the field device, such as "connected", "active", "not connected", "inactive" or the like. Also, the attribute may describe an error, the occurrence of an error, a warning indication, and/or a maintenance indication. Also, the attribute may be related to the process variable and/or measurand sensed by the field device. For example, the attribute may describe the reaching of a limit level of a medium, a predetermined filling level, the reaching of a predetermined pressure value, the reaching of a predetermined temperature value, or the like.

If a condition defined in terms of the attribute occurs, the field device may detect the occurrence of the condition and, in response thereto, drive the at least one display element of the signal display such that the at least one display element of the signal display displays the color tone associated with the attribute for the respective condition. The state of the field device may therefore correspond to and/or be associated with a condition for the state, upon the occurrence and/or occurrence of which the at least one display element of the signal display and/or the color tone of the at least one display element of the signal display is activated and/or driven such that the at least one display element of the signal display displays the color tone associated with the attribute. In the context of the present disclosure, the color tone of the at least one display element of the signal display may denote a color and/or a color value of the at least one display element. For example, the at least one display element may illuminate in the specified color tone when the condition occurs and/or to signal the condition.

The control signal may include the attribute. Alternatively or additionally, the control signal may have information and/or data regarding the state and/or regarding the occurrence of a corresponding condition, which and/or which may be defined in the attribute. The field device may process the control signal, derive the color tone from the control signal, and/or derive the attribute from the control signal. Alternatively or additionally, the field device may derive the state and/or a condition for the occurrence of the state from the control signal. The "derive from the control signal" may denote a "determine based on the control signal".

According to an embodiment, the method further comprises a step of activating, on the field device, the determined color tone of the at least one display element of the signal display and the attribute associated with the determined color tone based on the control signal, such that when the state of the field device occurs and/or when a condition for the state occurs, the determined color tone is displayed via the signal display of the field device as signaling. The activating may thereby comprise driving the signal display and/or the at least one display element so that the at least one display element displays the color tone and/or illuminates in the color tone.

According to an embodiment, the method further comprises a step of storing the determined color tone and the attribute associated with the determined color tone in a memory of the field device. Upon occurrence of the condition and/or occurrence of a corresponding condition, which and/or which may be defined in the attribute, the user device may determine the color tone stored in the memory and drive the at least one display element so that the color tone is displayed.

According to an embodiment, setting the color tone comprises defining a color code, in particular an RGB color code or a CMYK color code, and/or any other possible color code representing the color tone. For example, a user may enter the color code via a user interface of the user interface device, such as by defining values and/or numerical values of the color code. The setting of the color code can be a mixing of the color tone, as it were, for example by entering the numerical values of the color code on the user device.

According to an embodiment, setting the color tone comprises actuating, for example by a user of the user device, a slider, a slider, a controller, and/or any other actuating element on the user device.

For example, a slider and/or a slide control can be displayed on a display and/or display element of the user device and actuated by the user. According to a position of the slider, a color tone and/or a color code can thus be defined and/or set, for example. This can provide an intuitive way for the user to select and/or set the color tone.

According to an embodiment, the step of setting the color tone comprises:
  providing a color palette on the user device; and
  mixing and/or createing the color tone based on the color palette.

Providing the color palette may comprise, for example, loading the color palette from a memory of the user device. In other words, at least one color palette may be stored in a memory of the user device. Alternatively or additionally, the color palette may be retrieved via the Internet and/or from any other data source. In other words, the step of providing the color palette may comprise retrieving and/or downloading the color palette via an internet connection of the user device.

According to an embodiment, the control signal is transmitted from the user device to a plurality of field devices for adjusting the signaling of multiple field devices. This can be done sequentially or simultaneously. In this way, a user can easily and quickly adjust the signaling of several or all field devices in a plant. The signaling of several field devices can also be coordinated in this way.

According to an embodiment, the step of determining the color tone further comprises:
   capturing, with a camera of the user device, an image of a signaling displayed via the signal display of the field device; and
   determining, with the user device, the color tone of at least one display element of the signal display based on an analysis of the image and/or an analysis of image data of the image.

The user device can therefore be used to take a picture and/or an image of an existing signaling of a field device. By means of image processing and/or image recognition, the represented color tone of the display element and/or signal display, for example as RGB code, can be determined in the recording and/or image. The determined color tone may then be associated with the attribute, which may define the state of the field device in which the color tone is to be displayed and/or the condition upon the occurrence of which the color tone is to be displayed. Subsequently, the control signal may be transmitted to the field device, another field device, and/or multiple field devices. The one or more field devices can control the at least one display element, such as a multicolor LED, upon occurrence of the condition defined in the attribute and/or upon occurrence of the condition defined in the attribute corresponding to the color tone, such as corresponding to the transmitted RGB code. This means that the user can equip his new system with exactly the same color coding or signaling as an existing system.

In order to evoke further meanings and/or situations, for example at an already installed plant, installed field devices can be brought into the desired situations and/or state either via often available test modes and/or via actual situations in the plant. By capturing an image of the signal display of a field device when the field device is outputting an actual signaling, the color tone can be determined and/or established using the user device, as explained above. The color tone so determined may subsequently be associated with the associated attribute. Alternatively or additionally, an individual color and/or color tone can be mixed via a color palette displayed on the HMI and linked to the attribute.

According to an embodiment, the user device comprises a communication module (or communication unit or communication circuitry) for wireless communication with the field device. Alternatively or additionally, the control signal is transmitted wirelessly to the field device via a communication module of the user device. For example, the communication module may comprise a Bluetooth module, a WLAN module, a radio module, and/or an infrared module. Based on wireless communication, signaling can be performed efficiently and in a short time. The user device can alternatively or additionally be connected to the field device via wired communication. For example, the field device may be connected to a bus and connected to the user device. The field device can also be configured as a two-wire field device and the user device can communicate with the field device via a HART protocol, for example, and/or transmit the control signal to the field device. Communication, for example via a CAN bus, a Profibus, an Ethernet connection, a mobile radio connection or the like, is also possible.

Another aspect of the invention relates to an user device for adjusting and/or setting a signaling of the field device displayable via a signal display of a field device, wherein the user device is configured to perform steps of the method as described above and below.

Features, elements and/or functions of the user device as described above and below may be features, elements and/or steps of the method as described above and below, and vice versa.

According to an embodiment, the user device comprises a user interface for input of a user input by a user of the user device. Further, the user device comprises a communication module for establishing a communication link with the field device and a control unit (also referred to as control module, controller or control circuitry). The control unit is configured to determine, based on (and/or in response to and/or in response to) a first user input, a color tone of at least one display element of the signal display of the field device; based on (and/or in response to and/or in response to) a second user input, associate the determined color tone with an attribute, the attribute representing a meaning of the determined color tone for indicating a state of the field device. The control unit is further configured to send (or transmit) a control signal to the field device via the communication module, the control signal including information and/or relating to the determined color tone and relating to the attribute associated with the determined color tone. For example, the control unit may determine and/or generate the control signal based on the color tone and the attribute.

Another aspect relates to the use of an user device, as described above and below, for adjusting and/or setting a signaling of the field device displayable via a signal display of a field device.

Another aspect relates to a program element that, when executed by a control unit of an user device, causes the user device to perform steps of the method as described above and below.

Another aspect relates to a computer-readable medium on which is stored a program element that, when executed by a control unit of an user device, causes the user device to perform steps of the method as described above and below In the following, embodiments of the invention are described with reference to the figures.

Similar, similar-appearing, identical or identical-appearing elements in the figures are given similar or identical reference signs. The figures are merely schematic and not to scale.

DETAILED DESCRIPTION OF EXEMPLARY EMBODIMENTS

Figure 1:
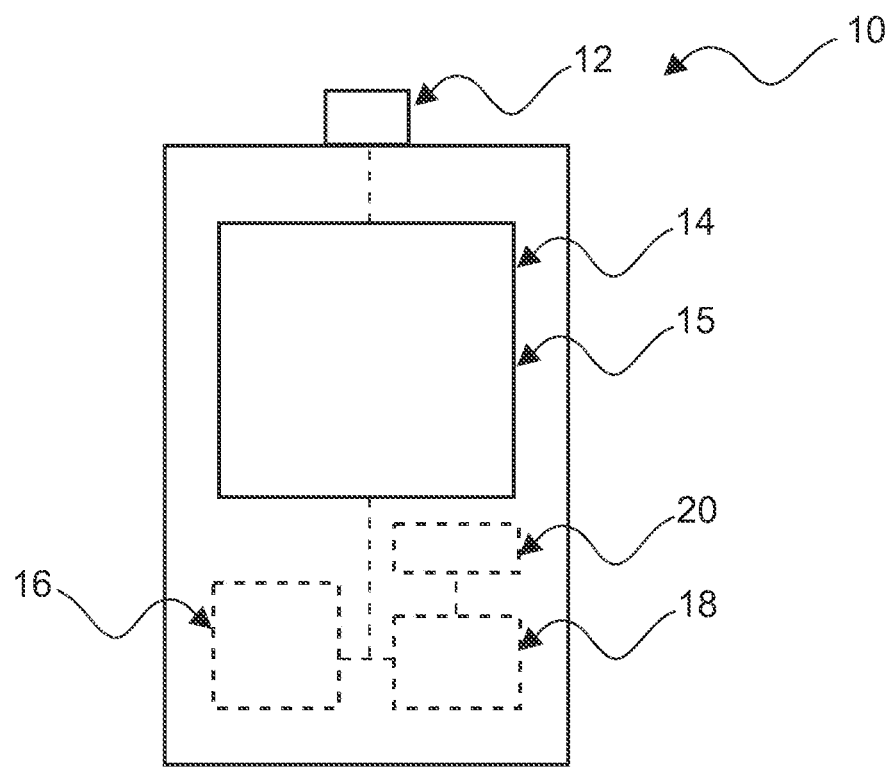
FIG. 1 schematically shows an user device according to an embodiment example.

FIG. 1 schematically shows a control unit 10 according to an embodiment.

The user device in FIG. 1 is exemplarily configured as a smartphone. However, the user device 10 can alternatively be a PC, a DTM, a computer, a laptop and/or any other terminal device.

Figure 2:
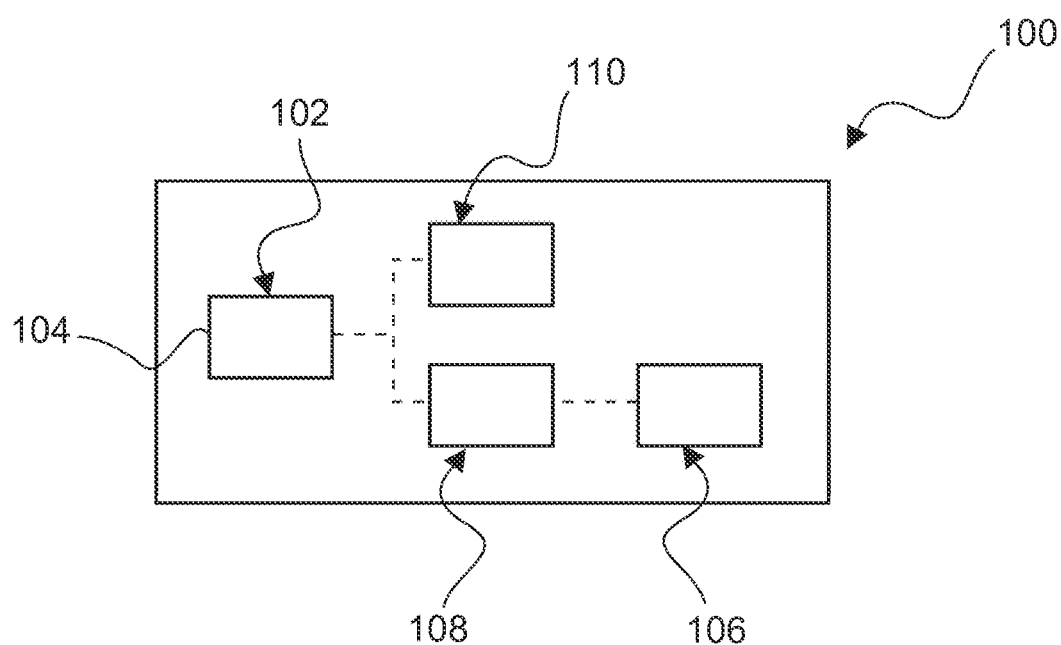
FIG. 2 schematically shows a field device according to an embodiment example.

The user device 10 has a camera 12 for capturing an image of a field device 100 (see FIG. 2). Furthermore, the user device 10 has a user interface 14 for entering user inputs. Furthermore, the user interface 10 comprises a display 15 and/or a display 15 on which, for example, the recording and/or the image of the field device 100 can be displayed. The display 15 and the user interface 14 may be combined, for example in the form of a touch display.

Further, the user device 10 includes a communication module 16 for establishing a communication link to the field device 100. The communication module 16 may be a wireless or wired communication module 16.

For example, the user device 10 may establish a WLAN, a Bluetooth, an infrared, and/or a radio connection with the field device 100 and/or exchange data or signals via the communication module 16. The communication module 16 can have multiple communication units that can be connected to other devices and/or the Internet via different communication protocols. For example, the user device 10 may establish an Internet connection via the communication module 16 and may be coupled to the field device 100 via a Bluetooth connection.

The user device 10 further comprises a control unit 18 and a memory 20. The memory 20 may store software instructions, a program element, a program, and/or an app that, when executed by the control unit 18, cause the user device 10 to perform steps of the method as described above and below.

In particular, the control unit 18 is configured to determine a color tone of at least one display element 104 of the signal display 102 of the field device 100 (see FIG. 2) based on a first user input via the user interface 14, to associate the determined color tone with an attribute based on a second user input via the user interface 14, wherein the attribute represents a meaning of the determined color tone for indicating a state of the field device 100, and transmitting a control signal to the field device 100 via the communication module 16, wherein the control signal includes information and/or data regarding the determined color tone and regarding the attribute associated with the determined color tone, as described in detail in subsequent figures.

FIG. 2 schematically shows a field device 100 according to an embodiment.

The field device 100 includes a signal display 102 having a display element 104. The signal display 102 may also have multiple display elements 104. For example, the display element 104 may be a multi-color LED 104.

The field device 100 further comprises a communication module 106, via which the field device 100 can be coupled and/or connected to the user device 10. In particular, the field device 100 can receive the control signal from the user device 10 via the communication module 106.

Further, the field device 100 includes a control unit 108 and a memory 110. The memory 110 may store software instructions and/or a program element for controlling the field device 100.

When the field device 100 receives a control signal from the user device 10, the control unit 108 may process the control signal and/or determine the color tone and associated attribute based thereon. The color tone and attribute may then be stored in the memory 110.

If the condition defined in the attribute and/or the condition defined therein occurs, the control unit 108 may control the signal display 102 and/or the display element 104 such that the color tone stored in the memory 110 is displayed via the display element 104. For example, the display element 104 may illuminate in the color tone. This provides signaling of the field device 100 to signal the condition and/or the occurrence of the condition according to the attribute.

Figure 3:
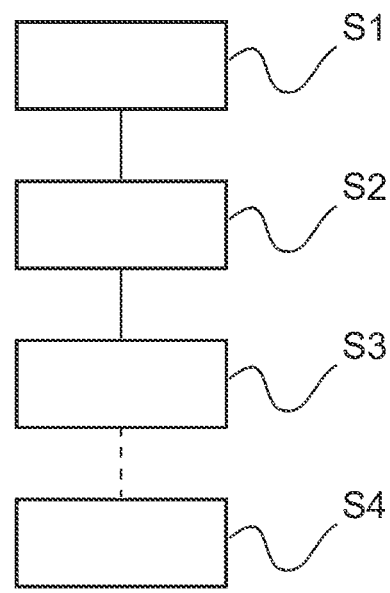
FIG. 3 shows a flowchart illustrating steps of a process according to an embodiment.

FIG. 3 shows a flowchart illustrating steps of a method for adjusting and/or setting a signaling of the field device 100 displayable via a signal display 102 of a field device 100 by means of an user device 10. The user device 10 may be the user device 10 according to FIG. 1 and the field device 100 may be the field device 100 according to FIG. 2.

In a step S1, a color tone of at least one display element 104 of the signal display 102 of the field device 100 is detected, set, and/or determined using a user interface 10.

In step S1, a user of the user device 10 can specify the color tone via one or more user inputs. For this purpose, for example, a color code, in particular an RGB color code or a CMYK color code, numerical values and/or values of the color code representing the color tone may be determined and/or defined. The user can also operate one or more sliders, one or more controls, and/or one or more other controls to specify and/or define the color tone and/or a color code.

For example, the user can select the color tone from a list, which may be stored in the memory 20 of the user device 10. Also, a color palette may be used to define the color tone. For example, the user may mix and/or create the color tone based on the color palette. For this purpose, the color palette can be shown on the display 14 of the user device 10.

The color palette can be stored in the memory 20. Alternatively or additionally, the color palette can be loaded onto the control unit 10 via an Internet connection using the communication module 16.

Figure 4:
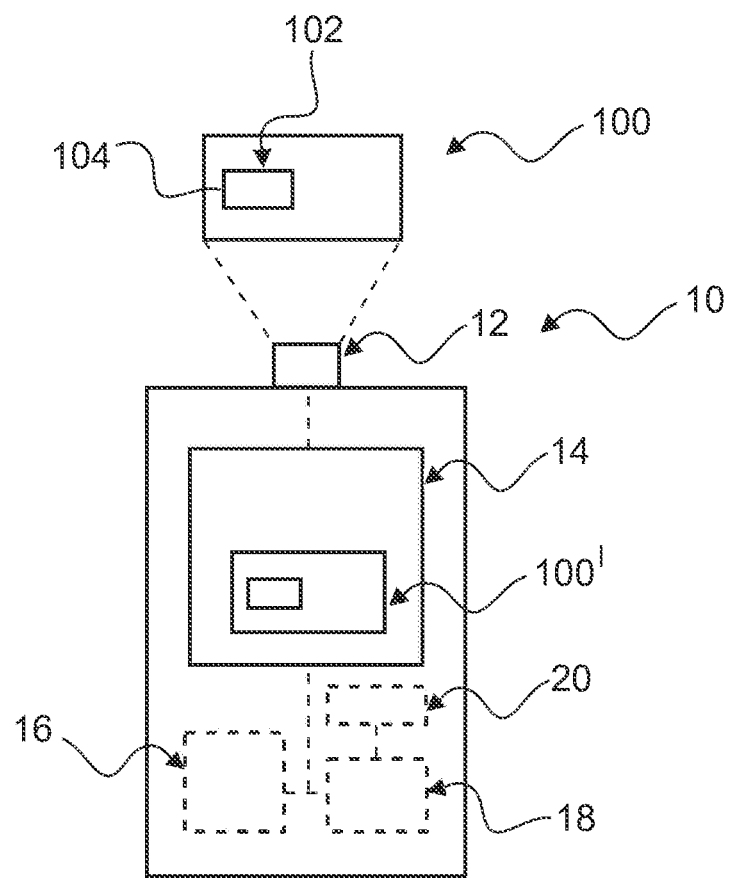
FIG. 4 shows an user device and a field device for illustrating steps of a method according to an embodiment.

Alternatively or additionally, an image of the signal display 102 of the field device 100 may be captured by the camera 12 of the user device 10 and the color tone may be determined and/or set based on the image, as explained in more detail in the embodiment example of FIG. 4.

In a further step S2, an attribute to the defined color tone of the at least one display element 104 of the signal display 102 of the field device 100 is assigned and/or associated with the color tone by means of the user device 10, wherein the attribute represents a meaning of the defined color tone for indicating a state of the field device 100 via the signal display 102. The attribute may define the state of the field device 100 and/or a condition for the state to occur. For this purpose, the user may, for example, define an attribute and/or a condition defined therein by selecting it from a list, which may be stored in the memory 20, for example. Alternatively or additionally, such a list may be received via the communication module 16, for example via the Internet. Attributes and/or states of the field device 100 may be, for example, "connected", "active", "not connected", "inactive" or the like.

Also, the attribute may describe, specify, and/or define an error, the occurrence of an error, a warning, and/or a maintenance notice. For example, the user may select and/or define an error and/or error code from a list, thereby causing the color tone to be displayed on the field device 100 in the presence of the error.

Also, the attribute may be related to the process variable and/or measurand sensed by the field device 100. For example, the attribute may describe the reaching of a limit level of a medium, a predetermined fill level, the reaching of a pressure value, the reaching of a temperature value, or the like. To this end, a user may specify, for example, the corresponding level value, limit level value, temperature value, and/or pressure value on the user device 10 to customize the signal display 102 of the field device 100.

For this purpose, in a step S3, it is provided that a control signal is transmitted from the user device 10 to the field device 100, for example via a communication link by means of the communication modules 16, 106, the control signal containing information relating to the defined color tone and relating to the attribute assigned to the defined color tone. For this purpose, the control unit 18 of the user device 10 can generate the control signal based on the color tone specified by the user and the associated attribute, and transmit the control signal to the field device 100 via the communication module 16.

Optionally, in step S4, on the field device 100, the specified color tone of the at least one display element 104 of the signal display 102 and the attribute associated with the specified color tone may be activated based on the control signal so that when the state of the field device 100 occurs, the specified color tone is displayed via the signal display 102 of the field device 100 as signaling. For this purpose, the control unit 108 of the field device 100 may control the signal display 102 accordingly.

Optionally, in step S3 and/or S4, the defined color tone and the attribute (and/or corresponding data) associated with the defined color tone may be stored in the memory 110 of the field device 100. Upon occurrence of the condition defined in the attribute and/or the state defined therein, the control unit 108 may drive the signal display 102 so that the color tone associated with the attribute is displayed as signaling via the signal display 102.

Also, the user device 10 may be used to specify the color tone of a plurality of display elements 104 of the signal display 102, and may be associated with an attribute. Thus, the control signal may include information about multiple color tones of multiple display elements 104.

Also, in the manner explained above, the control signal may be sent to multiple field devices 100, sequentially or simultaneously, to adjust the signal indications 102 of multiple field devices 100.

FIG. 4 shows an user device 10 and a field device 100 for illustrating steps of a method according to an embodiment. The user device 10 may be an user device 10 and the field device 100 may be a field device 100 according to the preceding figures.

The camera 12 of the user device 10 can be used to take an image 100' of the signal display 102 of the field device 100 and/or an image 100' of the field device 100 and store it in the memory 20 of the user device 10, for example in the form of image data. Also, the image 100' may be displayed on the display 14 of the user device 10.

By means of image recognition and/or image processing by the control unit 18 in the field device 10, the shot 100' and/or the image 100' and/or associated image data of a signaling displayed via the signal display 102 of the field device 100 can be analyzed. In the captured image 100', the displayed color tone of the display element 104, such as a color code (e.g., an RGB code or a CMYK code) may be analyzed and/or determined.

For example, the user may mark the display element 104 on the image 100' shown on the display 14, such as by setting a pointer and/or marker in the image 100'. Based on such user input, the control unit 18 may determine, set, and/or define the color tone while processing the image data and/or the image 100'.

Once this color tone has been determined, the color tone can be linked to an attribute and/or a meaning. For example, the color "yellow" can be defined as an RGB code by specifying the color values R=255, G=255, B=0 and linked to the attribute "Sensor uncovered".

These two pieces of information are then transmitted to the field device 100 in the form of the control signal. Alternatively, all attributes can first be linked to colors and only then transmitted to the field device 100. The field device 100 can control the display element 104, such as a multicolor LED 104, in accordance with the transmitted RGB code when the defined meaning is present, the condition occurs, and/or the condition according to the attribute occurs. Thus, the user can equip his new system with exactly the same color coding and/or signaling as an existing system.

To invoke additional attributes, meanings, and/or situations on an already installed system, already installed field devices 100 can be brought to the desired state via often available test modes and/or via actual situations in the system. When the field device 100 is in the desired state, an image 100' can be taken of the signal display 102 and the color tone can be determined using the user device 10 as well as associated with the corresponding attribute. The color tone and associated attribute may then be transmitted in the form of the control signal to one or more additional field devices 100 to adjust the signaling, as explained above.

Also, a color palette may be used to define the color tone on the user device 10, such as to "mix" an individual color and then associate that color with the attribute.

The invention thus makes it possible to set color signaling via user devices, e.g. with integrated camera 12, in order to provide installed systems and newly installed sensor systems with the same color scheme.

Adjustment of the signaling of a field device 100 can be performed by means of camera 12 of the user device 10 and transmission of the color information into the field device 100, as explained above. The transmission can be wireless, for example via Bluetooth (LE), or via a wired interface.

In addition, self-defined color palettes and/or predefined color palettes from the Internet and/or another data source can be used to define the color tone. For example, standard color palettes from the Internet can be used, which are provided by standardization bodies, for example. The communication module 16 and/or a corresponding interface, which is used for data transmission, can be standardized, for example, in order to exchange manufacturer-independent data sets, for example in the form of the control signal. Using Bluetooth, predefined profiles could also be used for this purpose.

Supplementally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A method for adapting a signaling of a field device displayable via a signal display of the field device, the method comprising:
   specifying, with a user device, a color tone of at least one display element of the signal display of the field device, wherein the specifying of the color tone comprises:
      capturing, using a camera of the operating device, an image of a signal displayed via the signal display of the field device or an image of at least a part of the field device; and
      determining, using the operating device, the color tone of the at least one display element of the signal display based on an analysis of the image;

associating, with the user device, an attribute of the color tone of the at least one display element of the signal display, the attribute representing a meaning of the color tone for indicating a state of the field device;

transmitting a control signal from the user device to the field device, the control signal containing information relating to the color tone and relating to the attribute associated with the color tone;

storing the color tone and the attribute assigned to the color tone in a memory of the field device; and activating, on the field device, the color tone of the at least one display element of the signal display and the attribute assigned to the color tone based on the control signal so that, when the state of the field device occurs, the color tone is displayed via the signal display of the field device as signaling.

2. The method of claim 1, further comprising:
determining the color tone, wherein determining the color tone comprises defining a color code, in particular an RGB color code or a CMYK color code, which represents the color tone.

3. The method of claim 1, further comprising:
determining the color tone, wherein determining the color tone comprises:
providing a color palette on the user device; and
creating the color tone based on the color palette.

4. The method of claim 3, wherein providing the color palette comprises:
downloading the color palette to the user device via an Internet connection of the user device.

5. The method of claim 1, wherein the user device is at least one of a portable and a mobile user device.

6. The method of claim 1, wherein the at least one display element comprises a multicolor LED.

7. The method of claim 1, wherein the control signal is transmitted from the user device to a plurality of field devices.

8. The method of claim 1, wherein the user device comprises a communication module for wireless communication with the field device.

9. The method of claim 1, wherein the user device is a tablet PC, a smartphone, a laptop or a computer.

10. The method of claim 1, wherein the control signal is wirelessly transmitted to the field device via a communication module of the user device.

11. A user device for adapting a signaling of the field device displayable via a signal display of a field device, wherein the user device is configured to perform the method of claim 1.

12. The user device of claim 11, wherein the user device comprises:
a user interface for inputting user input by a user of the user device;
a communication module for establishing a communication link with the field device; and
a control unit configured to:
based on a first user input, determine a color tone of at least one display element of the signal display of the field device;
based on a second user input, associate the color tone with an attribute, the attribute representing a meaning of the color tone for indicating a state of the field device; and
transmit a control signal to the field device via the communication module, the control signal including information regarding the color tone and regarding the attribute associated with the color tone.

13. A method of using the user device of claim 11 to customize a signaling of the field device displayable via a signal display of a field device.

14. A non-transitory computer-readable storage medium comprising computer program instructions stored therein, which, when executed by a control unit of a user device, instructs the user device to perform the method of claim 1.

\* \* \* \* \*